United States Patent
Clark

(10) Patent No.: US 6,578,318 B1
(45) Date of Patent: Jun. 17, 2003

(54) METHOD AND APPARATUS FOR RAISING VINE PLANTS

(75) Inventor: Doug Clark, Del Rey, CA (US)

(73) Assignee: Pitts Carbonic & Ag Services, Inc., Fowler, CA (US)

( * ) Notice: Subject to any disclaimer, the term of this patent is extended or adjusted under 35 U.S.C. 154(b) by 0 days.

(21) Appl. No.: 09/638,176

(22) Filed: Aug. 11, 2000

(51) Int. Cl.⁷ .............................................. A01G 17/02
(52) U.S. Cl. ....................................................... 47/58.1
(58) Field of Search .......................... 47/2, 70, 46, 47, 47/44, 58.1

(56) References Cited

U.S. PATENT DOCUMENTS

| | | | |
|---|---|---|---|
| 3,526,993 A | 9/1970 | Siebol | |
| 3,546,856 A | 12/1970 | Hiyama | |
| 3,585,756 A | 6/1971 | Johnson | |
| 3,807,089 A | 4/1974 | Senese | |
| 4,480,402 A | 11/1984 | Hiyama et al. | 47/1 R |
| 4,703,584 A | 11/1987 | Chazalnoel | |
| 4,965,961 A | 10/1990 | Broyles | |
| 5,144,768 A | 9/1992 | Hiyama et al. | 47/46 |
| 5,272,834 A | 12/1993 | Jarahian | |
| 5,337,514 A | 8/1994 | Hiyama et al. | 47/44 |
| 5,411,561 A | 5/1995 | Conley | 47/58 |
| 5,557,883 A | * 9/1996 | Walker | 47/46 |
| 5,638,636 A | * 6/1997 | Hiyama et al. | 47/44 |
| 5,692,339 A | 12/1997 | Conley et al. | |
| 5,711,109 A | 1/1998 | Pitts | 47/58 |
| 5,797,214 A | * 8/1998 | Parrish et al. | 47/47 |

FOREIGN PATENT DOCUMENTS

SU 1586608 A1 8/1990

OTHER PUBLICATIONS

Successful Raisin Production for the 21st Century—Using Existing Trellis, Trellis Retrofits and New Plantings, Dec. 2001, Sun–Maid Growers of California, U.S.A.
Christensen, L. Peter, Current Developments in Harvest Mechanization and DOV, Chapter 33 of Raisin Production Manual (Publication 3393), 2000, University of California.
How a Cluster of Grapes is Born in Puglia, Sep. 1980, Italy.
Gould, I.V. and Whiting, R.J., Mechanization of Raisin Production with the Irymple Trellis System, Transactions of the ASAE, Jan.–Feb. 1987, pp. 56–60, vol. 30, No. 1.
Smart, Richard and Robinson, Mike, Sunlight into Wine—A Handbook for Winegrape Canopy Management, 1991, Winetitles, Adelaide, South Australia.

(List continued on next page.)

*Primary Examiner*—Peter M. Poon
*Assistant Examiner*—Son T. Nguyen
(74) *Attorney, Agent, or Firm*—Richard A. Ryan

(57) ABSTRACT

A method for raising vine plants having a fruiting portion and a renewal portion, such as grapevines, for enhanced production and healthier crop. The method vertically separates the fruiting zone from the renewal zone by placing the fruiting canes in an upper zone apart from the renewal canes in the lower zone. The separation of zones improves air circulation and sunlight exposure, allows the two zones to have different cultivation techniques applied as necessary and permits the harvesting of the fruit without harming the renewal canes, making the method particularly applicable for fruit that can be dried-on-the-vine, such as raisins. A vertical canopy trellis apparatus for use with the method facilitates separation of the two zones and the switch from renewal canes to fruiting canes. A double tunnel harvesting apparatus allows the upper fruiting zone to be efficiently and effectively harvested while protecting the lower renewal zone from damage.

26 Claims, 7 Drawing Sheets

OTHER PUBLICATIONS

May, P. and Clingeleffer, P.R., Mechanizing the Production of Sultana (Thompson Seedless) Raisins, Davis Grape and Wine Centennial Symposium Proceedings 1880–1980, pp. 191–194, University of California, U.S.A.

Hayes, Johns, Mollah, Moley, The Shaw Trellis—A New Innovation in Trellis Dried Sultana Production, pp. 5–8, Technical Report Series No. 193, Australia.

Studer, Henry E., Vine Drying of Raisin Grapes, U.S.A.

Studer, Henry E., Vine Drying of Raisin Grapes in Coachella Valley, California Grape Grower, Mar. 1981, pp. 16, 19–20, U.S.A.

Studer, Henry E. and Olmo, Harold P., Vine–Drying of Thompson Seedless Grapes, Transactions of the ASAE, 1973, pp. 944–948, U.S.A.

Ballantyne, Ian and Macrae, Ian, Trellis Drying & Mechanical Harvesting of Grapes, Aug. 1986, Department of Agriculture and Rural Affairs, Australia.

Shaulis, N., Amberg, H. and Crowe, D., Response of Concord Grapes to Light, Exposure and Geneva Double Curtain Training, Proceedings of the American Society for Horticultural Science, vol. 89, pp. 268–280, 1966.

Clingeleffer, P.R. and May, P., The Swing–Arm Trellis for Sultana Grapevine Management, S. Afr. J. Enol. Vitic., vol. 2, No. 2, 1981, pp. 37–44, South Africa.

Spectrum advertisement, American Grape Harvesters, Fresno, CA, U.S.A.

Korvan advertisement, Korvan Industries, Inc., U.S.A.

\* cited by examiner

METHOD AND APPARATUS FOR RAISING VINE PLANTS

BACKGROUND OF THE INVENTION

A. Field of the Invention

The present invention relates to a method and apparatus for raising plants that facilitates increased and healthier production. The method and apparatus are uniquely situated for the commercial production of crops that have certain botanical characteristics of growth, such as vine plants. This method will allow for fully automated harvest, having had minimal manual labor expended on maintenance.

B. Description of the Prior Art

Botanical characteristics have long plagued the growing process. Many plants inhibit fully automated harvest and continue to be susceptible to attack. These adverse consequences have forced the development of remedies. The remedies associated with the prior art have been minimally successful in accomplishing the long-term goals that were desired.

To reduce the cost associated with harvesting grapes, raisins and other vine crops, growers have developed various new methods of growing the crops that reduce labor costs while providing an improved product. The conventional method of raising grapes or raisins is to grow the vines in separate parallel rows utilizing a trellis system that runs along the row producing rows of vines approximately four to six feet high. Typically, the raisin grapes are cut from the vine and placed on paper trays laying along the rows of vines. One improvement in growing raisins and other dried fruit is referred to as the dried-on-the-vine ("DOV") methods. The DOV methods of growing raisins leave the grape clusters on the vines during the drying process, as opposed to laying them on the paper trays in the dried-on-the-ground method. To dry the fruit on the vine, labor crews go through the vineyard and cut the canes having fruit so that the grapes on those canes will dry to produce raisins.

The successful production of grapes and dried-on-the-vine raisins relies upon the patterns of growth of the plants and their training for improved functionality. In its natural state, the grapevine has a random and haphazard growth pattern. The trunk produces cordons, which then produces canes that extend, producing the fruit and foliage of the vine. The foliage surrounds the fruit and the density of the two elements decreases the air circulation necessary to ward off certain problems. The density of the vine also prevents the sun from penetrating to the fruit and allowing for its further development. Although direct sunlight can be harmful, causing burns on the fruit, it is important to the process of dried-on-the-vine raisins for sunlight to reach the fruit.

Training the flexible portions of the grapevines in the horizontal method does allow for the density of the plant to be spread over a greater area. This type of separation, typically the north-south division practiced today, does make the fruit more accessible to the sunlight, however the growth of the plant on the trellis system continues to shade the fruit, not allowing sufficient light to it for proper maturation.

It is the density of the grapevine that continues to plague the plant with disease, fungi, and molds. These problems flourish in dark, damp environments. The growth pattern of the grapevine creates an immense trapping device and a protection from the sun for these and other problems. These damaging factors can be devastating to crops. Allowing the sunlight to the fruit reduces the moisture that remains on and around the fruit as well as assisting in the process of drying the fruit. In areas that typically receive a late season rain, the current trellising systems do not allow for the invaluable drying effects of the sun to be used efficiently.

Vineyards can be sprayed for increased resistance to molds and parasites, however there is an advantage in marketing fruit that has not been subjected to constant spraying of pesticides. Fruit grown without pesticides have a better value. Increased air circulation is one method to improve the effectiveness of spraying done to a vineyard, allowing less spraying to be done. Decreasing the density of the plants allows for the pesticide to be more effective with fewer applications because it moves freely in the plants to cover a greater area. Unfortunately, the typical trellis system creates a dense canopy raised above the fruit, which hangs below, to simplify harvesting. The low air circulation of this method retains trapped moisture that creates the molds, fungi, and parasites which are problematic and must be addressed by spraying. As a result, it is known that increasing air circulation is advantageous to increased production, decreased loss of product and reduced spraying.

Methods of raising crops for the prevention of these problems has been faced a number of times. For instance, Sun Maid has developed a system called the South Side or Sun Maid System. The rotation of sides, north to south, has allowed for the increased growth of canes and a maturity to be attained that allows for increased production of fruit and decreased the time in which the raisins are dried. This was all accomplished by increased circulation within the plant and greater exposure of the fruit to the drying sun. The above-referenced South Side System is described in U.S. Pat. No. 5,411,561 to Conley and U.S. Pat. No. 5,557,883 to Walker. This system, which utilizes a modified conventional trellis structure, trains the canes into a divided canopy with the fruiting canes primarily on one side (the south side) of the rows and renewal canes on the opposite side. Another DOV system is described in U.S. Pat. No. 5,144,768 to Hiyama, et al. In the Hiyama system, a modified trellis system is utilized to horizontally segregate the canes that will produce fruit in one year from the canes which are to produce fruit in the following year. Control wires are used to move the renewal canes from the current year's growing row to the next year's growing row. A non-DOV system is set forth in U.S. Pat. No. 3,585,756 to Johnson, which describes a method of growing grapevines where cordons are bent in a semi-circular portions and attached to an upper wire to grow fruit therefrom (i.e., spur pruning). The bending of the cordons is to facilitate shaking so as to dislodge the fruit. Replacement cordons can be grown on the lower wire to replace the fruiting canes as they become too stiff for effective shaking.

There are a number of other methods of growing grapes and raisins that take advantage of the DOV principles. Some of these methods utilize the conventional trellis system while others utilize less commonly employed trellis systems, such as an overhead trellis system. The overhead trellis systems allow the vines to be trained such that the canes grow over the trellis wires disposed between rows of upright posts that are placed along the rows of vines. The posts have one or more cross-arms that are connected to the trellis wires. One method of growing grapes and raisins on an overhead trellis system is disclosed in U.S. Pat. No. 5,711,109 to Pitts. In the Pitts method, the vine plants are separated to form four cordons and trained such that two pairs of cordons grow along parallel courses but opposite each other. Canes produced by the cordons grow substantially perpendicular to the cordons toward the canes produced by an adjacent row of vines over an overhead trellis structure. This method utilizes an alternate bearing system wherein during each growing season one row is a fruiting row and the adjacent row is a renewal row. During the following season, the rows are reversed. This method of growing grapes and raisins is referred to as the quadrilateral, alternate bearing method and has been found to substantially increase production of grapes and raisins. In another method developed by Lee Simpson of Madera, Calif., the canes grow from the head of the vine and are placed across the wires such that the crop will grow in a generally vertical downward direction from the canes between the rows. This method also utilizes the alternate bearing system.

Prior trellis systems have allowed for the separation of producing and non-producing flexible portions of vine plants. The process has been to separate the producing and non-producing portions, on a trellising apparatus, with the trunk of the vine in the center and the separate portions extending on either side of the trellis over the alley. The separations are determined by which canes will be in production and which will produce on a rotational basis. This method allows for one side to be in use, allowing for the other to mature while providing increased air circulation. Examples of trellis systems for DOV raisins are described in U.S. Pat. No. 5,557,883 to Walker, U.S. Pat. No. 5,337,514 to Hiyama, et al., and in an article entitled "Current Developments in Harvest Mechanization and DOV" by L. Peter Christensen in Raisin Production Manual published by the University of California in 2000. The Walker trellis is configured particularly for use with the South Side System described above. FIG. 5 of the patent shows a vertical separation of the fruiting and renewal canes that places the renewal canes in a U-shaped member above the arm having the fruiting canes. The Hiyama trellis is configured to be used with the Hiyama method described above. This trellis utilizes a pivot member to move a control wire so as to carry the canes to a position overlying the horizontal support member of the trellis structure. The "Current Developments" article describes an Open Cross trellis as a modified version of the Hiyama trellis. The Open Cross trellis that has the fruiting canes tied out to horizontal support members and the renewal shoots are directed upward between vertical pairs of wires or moved upward with moveable wires.

Farming is also plagued with the expense of manual labor. Although many conventional trellis systems have adapted grapevines and similar plant life for improved production, they fail to decrease the necessity for large amounts of manual labor. Making the fruit more readily accessible to the laborer decreases the amount of time that is expended in gathering the fruit at harvest, separating the flexible portions and pruning.

Several harvesting machines have been developed to harvest DOV raisins. Examples of these machines are disclosed in U.S. Pat. No. 5,355,667 to Scott, U.S. Pat. No. 6,009,696 to Walker and U.S. Pat. No. 6,012,276 to Walker. Generally, these patents describe harvesting machines that are either pulled or driven between the rows of vines with a plurality of rods or paddles extending from the side of the harvester such that the rods or paddles engage the plants to dislodge the grapes or raisins from the vines. The dislodged grapes or raisins are collected on a conveyance system and transported up and over the vines into a truck or bin trailer pulled be a tractor in the adjacent row. U.S. Pat. No. 4,480,402 to Hiyama describes a harvester that allows the grapevines to pass through the frame of the harvester so as to harvest the raisins from the lower section having the fruiting canes.

Mechanical harvesters for harvesting grapes or raisins grown on an overhead trellis system are also known. For instance, U.S. Pat. No. 5,423,166 to Scott is directed to a grape and raisin harvester in the form of a trailer that utilizes a series of spinning rods fashioned into a rotating rolling brush that knocks the grapes or raisins off the plants and into one or more boxes located on the trailer platform. The harvester is pulled along the row by a tractor. The rotating rolling brush, referred to as a shaker head, is raised or lowered by the use of hydraulic cylinders linked to the shaker head. U.S. Pat. No. 6,012,276 to Walker, primarily a device for harvesting DOV raisins grown on modified conventional trellises, suggests that the harvester head can be disposed such that the beater rods extend upward for use in overhead trellis systems. However, no reference is made to how the conveying system is modified to convey the raisins over the vines.

Each of the aforementioned patents or other prior art presents a method of growing DOV fruit, a trellis apparatus and/or an apparatus for harvesting DOV fruit. However, nothing in the prior art discloses a method of growing vine plants that places the fruiting portion of the vine above and separate from the portion of the vine that is used for a following year's crop. In addition, nothing in the prior art discloses a trellis structure or a mechanical harvester that is specially suited for harvesting fruit grown pursuant to such a method. Consequently, a need exists for a method of growing vine plants, with an associated trellis system and harvester, that is easily adapted to new or existing vineyards, provides for improved fruit quality and increased production, and reduces the costs of raising such plants.

SUMMARY OF THE INVENTION

The method of raising vine plants, vertical canopy trellis and double tunnel harvesting apparatus of the present invention solves the problems and provides the desired benefits identified above. That is to say, the present invention provides a method of raising vine plants that vertically separates the fruiting canes from the renewal canes by placing the fruiting canes in a separate zone above the renewal canes. In addition, the present invention provides a trellis system and dried fruit harvester specially configured for such method.

The conventional trellis systems, with the horizontal canopies, have not been able to increase the planting ability to the degree of the vertical canopy system of the present invention. Increased planting of grapevines is possible in vineyards using the vertical canopy trellis system because it moves the plant growth upward instead of outward. The increased planting, due to the vertical movement, also decreases the width necessary for each row. The decrease in width allows for increased planting and therefore increased production. The alternate method of cultivating, to that of standard practice today, will be achieved best by the over the row cultural practice incorporating the Greg Oire Tractor or equivalent. These types of cultural practices, where the tractor rides on top of the row, allows for denser row planting, thereby increasing production. Over the row tractoring along with the double tunnel mechanical harvesting system, herein described, is an invaluable part of the cultivating and harvesting process of dried-on-the-vine raisins.

Any spraying that the farmer does choose to do with the vertical trellis system of the present invention will be more effective because of its method of raising the flexible portions and extending them, while further separating the vulnerable fruit. In addition, the present invention will more clearly differentiate the separation by raising the producing flexible portions and pruning them at harvest to ensure those canes are not used the following season. This upward movement also improves the integrity of the trellis apparatus because it removes the strain placed on the stake in the typical horizontal arrangement. Thus, the balance of the vertical system is unmatched.

The double tunnel mechanical harvesting system is a mechanical raisin harvesting system which divides the canopy into two distinct portions, unlike its present counterparts in the wine grape industry, such as the Up Right harvester or equivalent, which employ a single tunnel that the grapevines travel through. The lower tunnel of the double tunnel mechanical harvesting system seals and protects the lower canopy, while the upper canopy is harvested. The picking rods in the upper tunnel mechanically harvests the dried-on-the-vine raisins. Since the upper tunnel is sealed from the lower canopy, virtually all the raisins from the upper canopy are harvested, minimizing crop loss, while eliminating grapes from the head of the vine to contaminate the raisin harvest. The double tunnel mechanical harvesting system will also fill the necessity of the smaller size tractor needed for increased row planting.

The advantages of the present invention to provide an improved method and apparatus for raising grapevines and similar botanicals is that the present invention is more dependable, durable, efficient and economical than present systems due to the training of the flexible portions of the plant upward along the vertical trellis apparatus to provide for increased circulation within the dense plant and the vertical segregation of the upper and lower canopies into fruiting and renewal portions. The upper canopy raises the fruit and exposes it to the sun in a manner unlike that of prior art growing methods and apparatuses The growing method and trellis apparatus of the present invention results in the production of a healthier crop of superior quality dried fruit because of the increased air circulation and exposure to the sun. In addition, the renewal canes are protected during the cultivating and harvesting procedures due to the vertical separation of those canes from the upper canopy having the fruiting canes.

Another advantage of the methods and apparatuses of the present invention is the increased efficiency and effectiveness of manual labor and the automated adaptation to cultivating and harvesting techniques, including over the row tractor cultivation and double tunnel mechanical harvesting. The methods and apparatuses of the present invention require less manual labor and only minimal training is required for that labor to perform the cultural practices necessary to grow and harvest superior quality dried-on-the-vine fruit, such as raisins. Use of the double tunnel harvester improves harvesting efficiency and minimizes product loss.

Yet another advantage of the methods and apparatuses of the present invention is the decreased area required for each plant, thus allowing for increased planting. The adaptability of the methods and apparatuses of the present invention to over the row tractor cultivation also allows for increased row planting.

Accordingly, the primary objective of the present invention is provide an improved method and apparatus for raising grapevines and similar botanicals that aids in the production of a healthier crop of superior quality dried-on-the-vine fruit at a reduced cost.

Another important object is to provide such methods and apparatuses which are advantageous to commercial farming of the production of grapevines and similar plant culture by controlling the growth of the plants with training provided by the apparatus in a more commercially successful manner with increased effectiveness and efficiency.

Yet another important object is to provide such a method and apparatus, which provides benefits to the large-scale farm and small farms alike and which is adaptable to new installations and retrofitting for use in existing vineyards.

Yet another important object is to provide such a method and apparatus which is employed to alter the random, haphazard growth patterns of the vine plants by providing an apparatus that trains the flexible portions and allows for the vertical segregation of the plants into growth zones, determined by the flexible portions that are currently producing and those that are not.

Another object is to provide such a method and apparatus that allows for the fruiting canes and first year canes to be vertically segregated from second year and renewal canes and allowing the fruit to be harvested without risk of damaging the renewal canes.

Another object is to provide such a method and apparatus that enhances the effectiveness and efficiency of manual labor and is adaptable to automated techniques.

Another object is to provide such a method and apparatus that substantially decreases the amount of manual labor necessary to maintain the plant culture.

Another object is to provide such a method and apparatus which allows for minimal training of the manual laborers with regard to the training process, pruning and harvesting.

Another object is to provide such a method and apparatus that decreases susceptibility to adverse circumstances, such as rain, mold, parasites and contaminants.

Another object is to provide such a method and apparatus that promotes the efficient harvest of dried-on-the-vine raisins.

Another object is to provide a harvesting system that allows vertical separation of canopy levels to be continued through the harvesting process.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the preferred modes presently contemplated for carrying out the methods and apparatuses of the present invention.

DETAILED DESCRIPTION OF THE PREFERRED EMBODIMENTS

Figure 1:
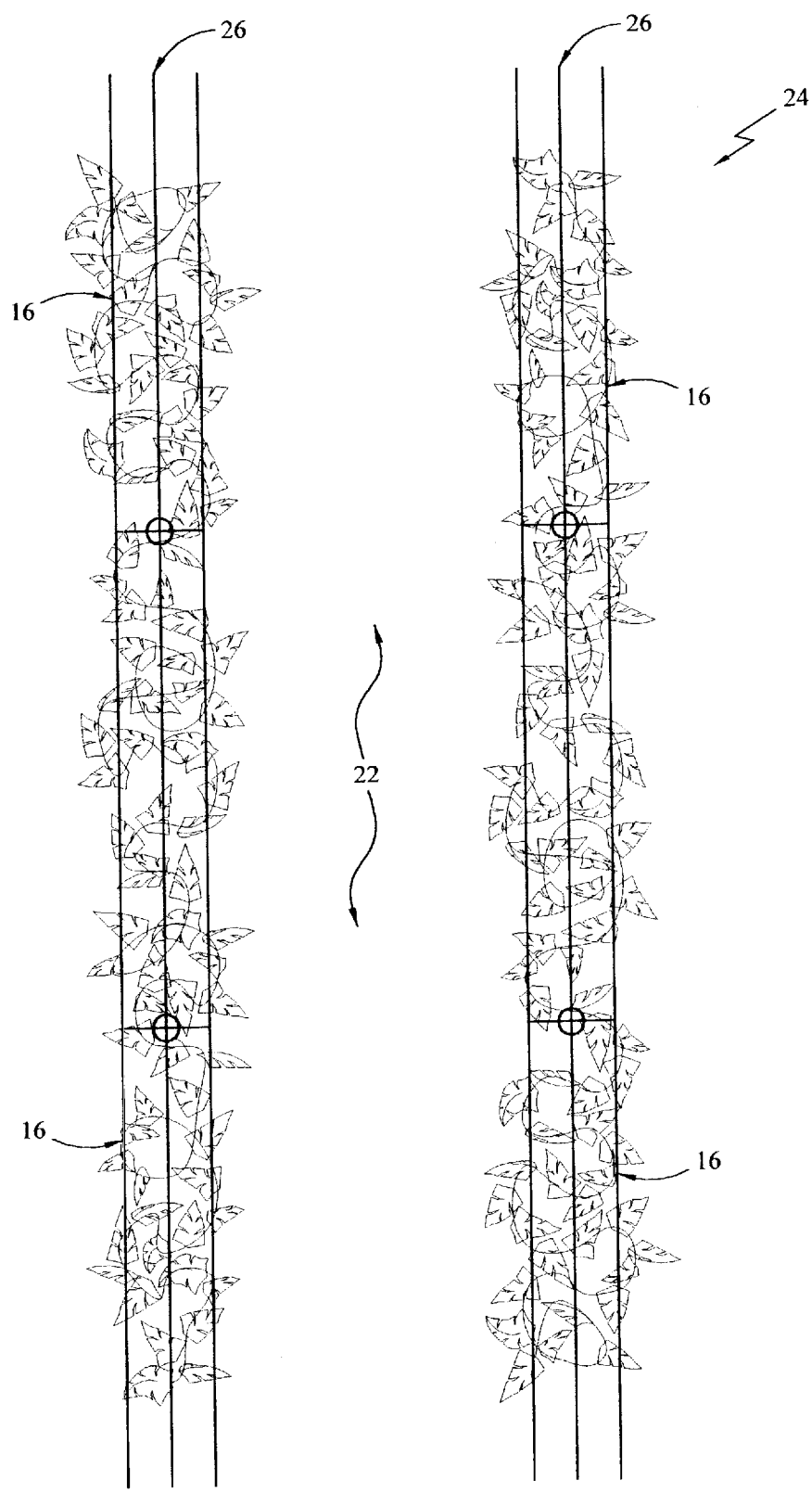
FIG. 1 is a plan overhead view of a section of a vineyard showing two rows of grapevines with the vines trellised in a divided canopy arrangement.

With reference to the figures where like elements have been given like numerical designations to facilitate the reader's understanding of the present invention, the preferred embodiments of the present invention are set forth below. The enclosed figures and drawings are illustrative of the preferred embodiments and represent a preferred way of configuring the present invention. Although specific components, materials, configurations and uses are illustrated, it should be understood that a number of variations to the components and to the configuration of those components described herein and in the accompanying figures can be made without changing the scope and function of the invention set forth herein.

Referring more particularly to the drawings, the methods and apparatuses of the present invention include a method for raising plants for dried-on-the-vine ("DOV") fruit production, designated generally as 10, a trellis apparatus 12 for use with the method 10 and a double tunnel harvesting apparatus 14 for harvesting DOV fruit from plants grown according to the method 10. The method 10 and trellis structure 12 can be employed in growing a wide variety of botanical plants that are used for producing DOV fruit, such as raisins. For convenience of illustration the plants are shown to be grapevines 16 herein. As is commonly known, the grapevine 16 grows upward from the soil 18. The soil 18 is generally level, with the vines 16 planted on a slightly raised berm 20. The berms 20 are the general area in which the grapevines 16 are to be grown. The area between the berms 20, referred to as the alley 22, allows for general watering practices, machinery to pass and/or laborers to walk through the vineyard 24.

Figure 2:
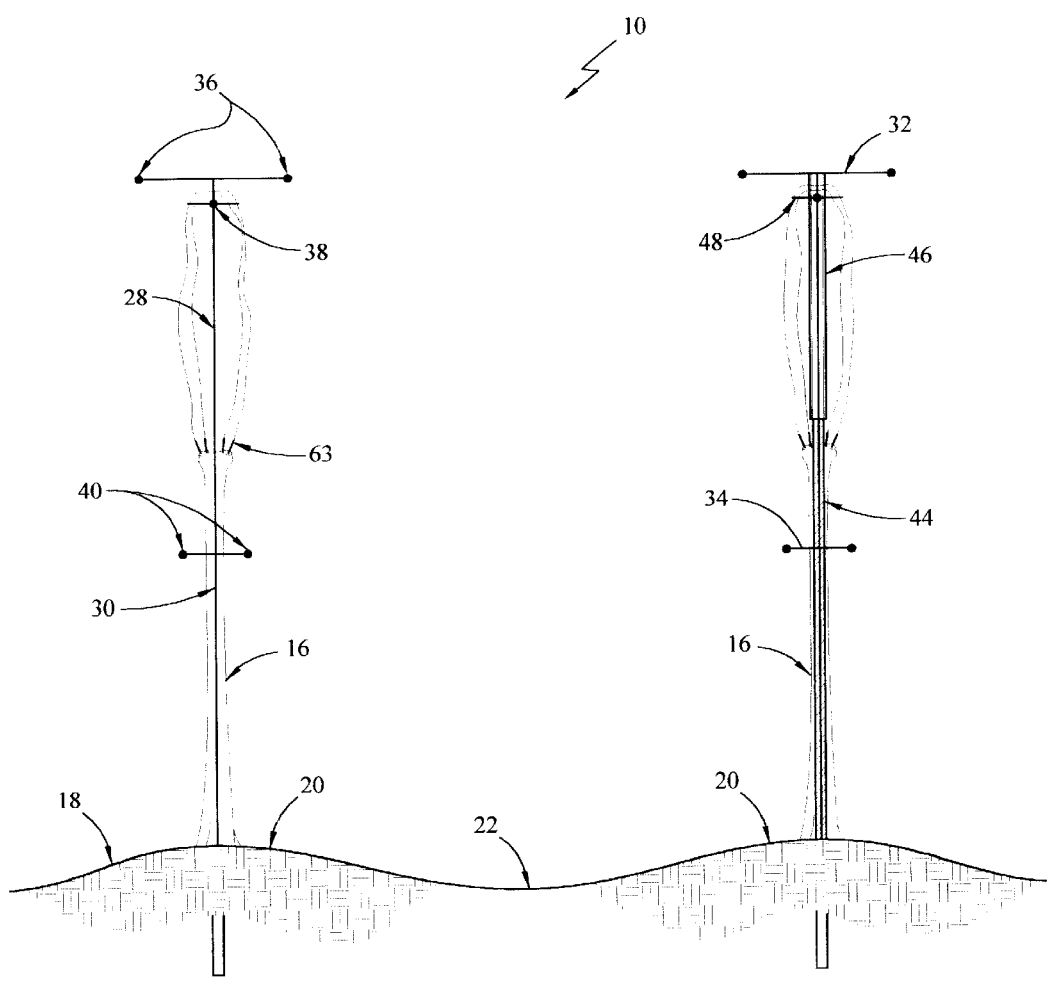
FIG. 2 is a fragmentary view in dormant season of the upper and lower canopies.

It will be understood that the planting of grapevines 16 is done in substantially parallel rows 26 with each plant 16 in a row 26 a typical distance of 4 feet to 6 feet from each other. FIG. 1 provides an overhead view of the planting method. FIG. 2 provides a fragmentary perspective of the planting method of the industry as incorporating the predetermined method and apparatus of the present invention. For purposes of illustrative convenience, two grapevines 16 are shown in FIG. 2. It is to be understood, however, that the grapevines 16 are planted and trained in a manner consistent with the method and apparatus of the present invention hereinafter to be described.

Figure 5:
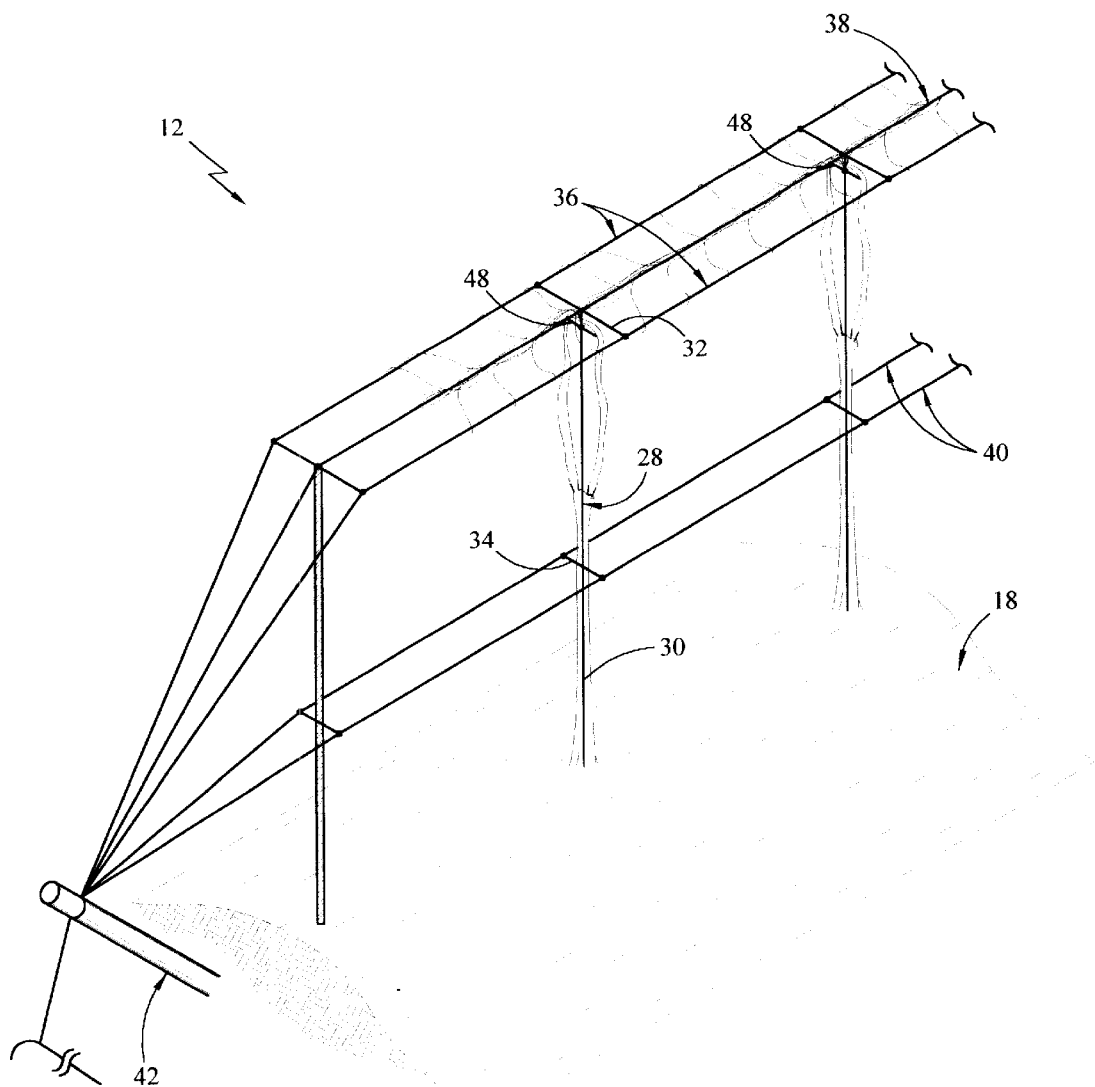
FIG. 5 is a fragmentary view of the transverse height tension support system for the trellis structure of the present invention having individual support structures at opposing ends of a row of grapevines.

The trellis structure 12 of the present invention comprises individual trellis members 28 comprising a stake 30, an upper cross-member 32 and a lower cross-member 34. As described below and shown in the figures, a pair of fixed upper canopy support wires 36, a main transverse wire 38 and a pair of moveable support wires 40 complete the trellis structure 12. Upper cross-member 32 can be a standard T-bar frame whereas lower cross-member 34 is an open-ear T-bar frame. The individual trellis members 28 will be interconnected with other trellis structures 28 for the length of each row 26. The interconnection of each member 28 to form trellis structure 12 is completed with the high-tension upper canopy support wires 36 that extend from each trellis member 28 to the next, as best shown in FIG. 5. The upper canopy support wires 36 are joined at the end of each row 26 of grapevines 16 at a support member 42 that is mounted in the earth at an angle sufficient to support the tension created by the weight of the vines 16 and fruit, as set forth below.

The support member 42 will be mounted in the berm 20, preferably canted at an angle as shown in FIG. 5. There will be a like member 42 at the opposing end that will be mounted so as to be canted in the opposite direction for the same purpose. Additional support may be deemed worthy and can be easily gained by adding a concrete foundation to the individual tension support member 42. The purpose of mounting individual members 42 at the end of each berm 20 is to provide the support required for the growing method 10 and trellis apparatus 12 of the present invention, hereinafter to be described. Each pair of tension support members 42 at the end of each row 26 of grapevines 16 will be interconnected by the three high-tension support wires 36 and 38 extending therebetween at the predetermined height and in tensioned relation. The preferred height of the main transverse wire 38 may be seen in FIG. 2. Although the actual height of the main transverse 38 can be adjusted to the individual use, in the present invention it is 6 feet to 6 feet 6 inches above the ground 18. The lower cross-member 34 can be positioned approximately 3 feet above the ground 18.

The upper canopy support wires 36 are used to support the trellis structure 12 in evenly spaced, parallel relation to each other. Each of the trellis structures has a vertical portion, stake 30, which can be constructed of wood, steel or any other suitable material. Typically, the trellis members 28 are mounted in the earth 18 at an 18 inch minimum depth in a predetermined position on the berm 20, extending in vertical relation, upward from the earth's surface 18. The trellis member 28 is centered on the respective berm 20 and row 26. The stake 30 extends from its position in the berm 20, mounted in the earth 18 to the upper, opposing end that extends to a predetermined elevation.

As set forth above, the trellis apparatus 12 has individual trellis members 28 that extend the entire length of the row 26 and, in the preferred embodiment, is comprised of sub-assemblies. The sub-assemblies are comprised of a standard t-bar frame or upper cross-member 32. The upper cross-member 32 attaches to the trellis member 28 mounted in the berm 20 and supported by the upper canopy support wires 36 attached to the high-tension support member 40 at opposing ends of the rows 26. The trellis structure 12 of the present invention allows for an existing vineyard, having the typical shorter existing stake 44, to be retrofitted with the upper trellis portion 46 to form trellis member 28. The ability to retrofit an existing vineyard is cost efficient and labor efficient. The upper portion 46 of the trellis member 28 can be mounted to the existing stakes 44 in any fashion the individual deems effective.

Each cross member 32 and 34 and hairpin clip 48 is mounted on a stake 30 or, if retrofitted, section 46. The cross members 32 and 34 and hairpin clip 48 may be secured to the stakes 30 by any means reasonable to that stake 30, (i.e., clamping on a metal stake or nailing on a wooden stake). The lower cross-member 34 will be of a smaller size than the upper cross-member 32. Each of cross-member 34 may be mounted at a suitable location thereon so that the support wires 36 and 40 of the sections are substantially equally spaced throughout the length of the row 26. The hairpin 48 is the portion of the method 10 and apparatus 12 that secures the movable wires 40, thereby pulling the canes of the fruiting flexible portions of the plant inward, allowing for definitive canopy separation. The fruit 50 and foliage 52 of the upper canopy 54 is supported by the upper cross-member 32 allowing for increased airflow and sunlight. The increased exposure of the fruit 50 in the present method 10 and trellis apparatus 12 assists in machine harvesting, as described below. The upward movement and lack of outward movement will allow for increased number of plants to be placed in contrast to the current trellis method due to the decreased space taken by each plant. The upper cross-member 32 will be supported by the high-tension support members 42 at opposing ends of the rows. Additional support of a main wire will not be necessary here because the distance of the plants is able to be decreased from the present standard of 8 feet, to the new distance of 4 feet to 6 feet. This will decrease the need for additional support and allow the individual to increase his planting and productivity levels of each vineyard 24.

A stake 30 is placed in the center of the berm 20, in close proximity to the base of the plant 16 shown in FIG. 2, extending straight up to a height of 6 feet to 6½ feet above the soil 18. The grapevine trunk 56 grows along the metal (typically) support stake 30. The lower cross-member 34 typically needs to be placed only on every fourth to sixth stake or as the individual chooses, in a manner consistent with the apparatus. The lower cross-member 34 purpose is to support the movable support wires 40 during the cleaning process of the vineyard, post harvest, when the severed canes are cleaned from the rows 26. The movable support wires 40 move in a manner consistent with the method and apparatus of the present invention, acting to control foliage on the renewal canes. The canes are supported, at this final separation, by the 16 inches to 18 inch long upper cross-member 32 and moveable support wires 40 which are held in the upper position by a hairpin, JR clip, or equivalent, shown as 48. The hairpin clips 48 and/or the upper cross-member 32 provides the support for the movable support wires 40. The upper canopy support wires 36 and the moveable support wires 40 provide the support of the fruit 50 and foliage 52 of the upper canopy 54.

In accordance with the method of raising plants for DOV fruit production 10 of the present invention, the grapevines 16 in the vineyard 24 can either be new or existing plants of any suitable variety. The grapevines 16 must be trained in a transitional phase, in accordance with the growing method 10 of the present invention, until the grapevines 16 reach a form for continued practice of the method 10 from growing season to growing season thereafter. This training process typically requires two growing seasons to complete and three growing seasons to extend from the beginning of such training through one full cycle of the practiced method 10.

Figure 3:
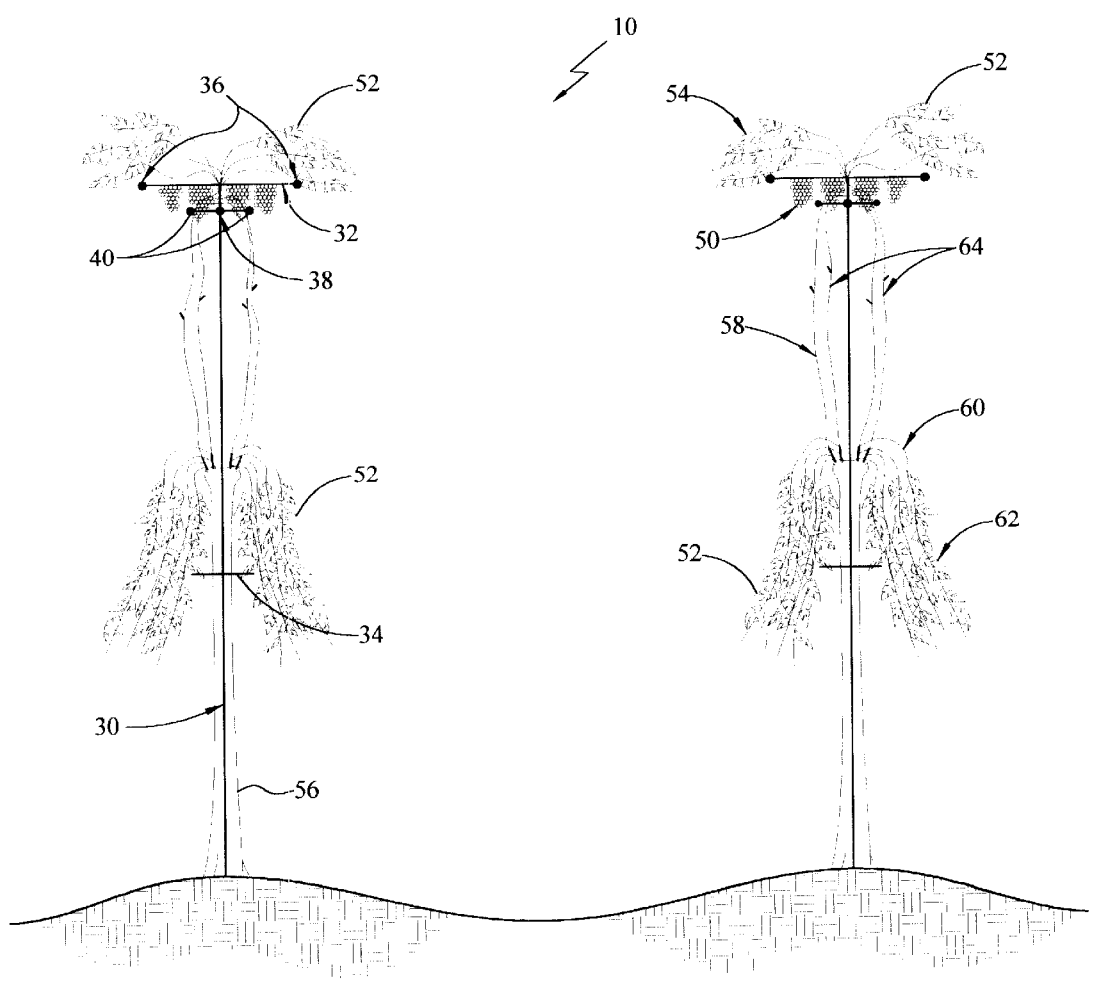
FIG. 3 is a fragmentary view of the trained flexible portions of the plant culture which illustrates the grapevine and the vertically segregated portions of the lower and upper canopies at the time nearest harvest having fruit fully exposed.
Figure 4:
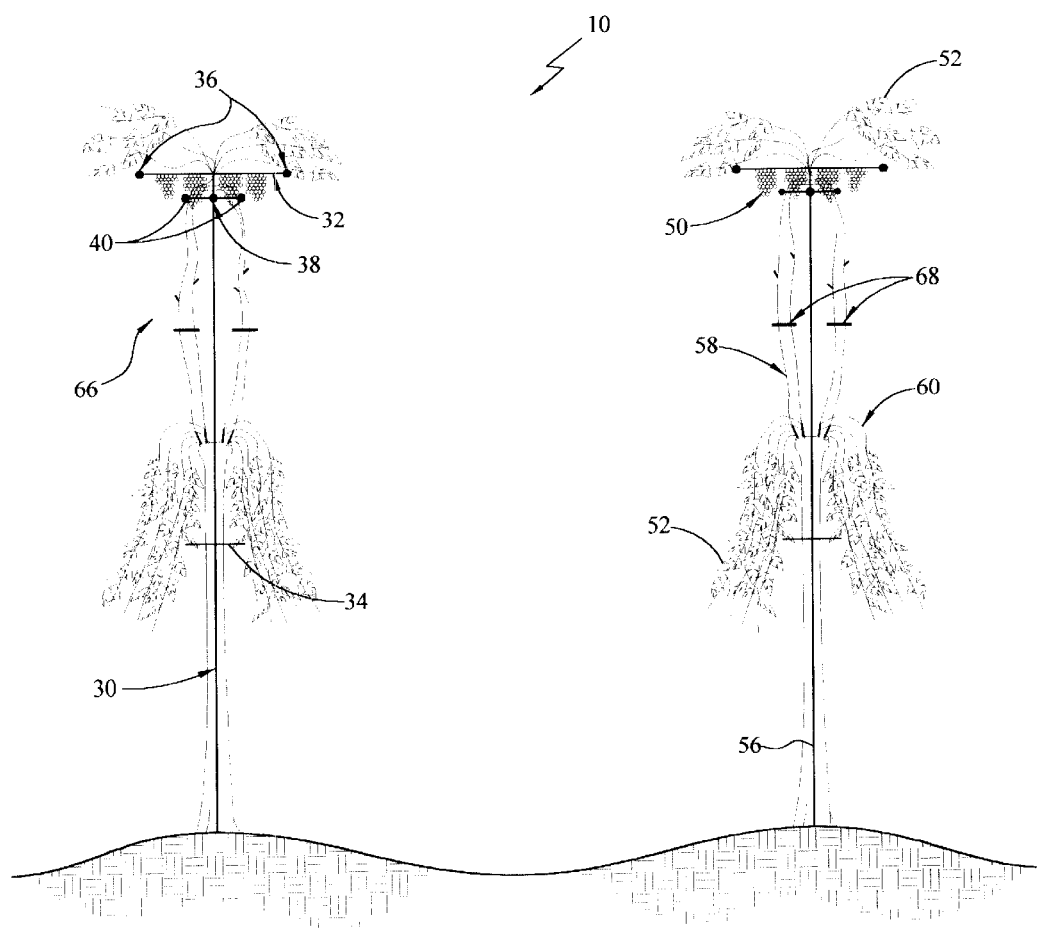
FIG. 4 is a fragmentary view of the plant culture just prior to harvest showing the foliage of the upper canopy being wilted and falling from the severed canes and the lower canes and cordons remain green and full of foliage for the second season.

It will be understood as described that a grapevine 16 is planted on the side of each stake 30 within their respective row 26. The trunk 56 of each grapevine is extended upwardly along the face of its respective stake, using suitable ties if necessary. The canes of a grapevine 16 grow from the cordon in random fashion and it is the canes that produce the crop, or bunches of grapes 50, and foliage 52. It is known that the canes produced in a single growing season do not produce a crop typically until the following season. The canes produced in one year must therefore be left in place until the next season for a crop to be produced. The canes that have produced a crop should be removed by pruning so that the next crop is able to be produced without infringement of the following years renewal canes. FIGS. 3 and 4 best show the growth, separation, and required practice for the present invention 10. The canes of each grapevine 16 are trained along the upper canopy support wire 36 in a direction away from its respective stake 30.

The canes of the grapevine 16 are divided into fruiting canes 58, those which will produce fruit in a given year, and renewal canes 60, those which will not produce fruit until the following year. The fruiting canes 58 are in the upper canopy 54 and the renewal canes 60 are in the lower canopy 62, shown in FIG. 3. The lower renewal canes 60 are not producing fruit, whereas the raised, fruiting canes 58 are producing fruit. At harvest, the upper fruiting canes 58 are severed, thereby allowing the grapes 50 to dry into raisins on the vine. When the production of the fruit 50 is complete the severed canes 58 are removed and replaced by the renewal canes 60 that were previously in the lower canopy 62, and thus the cycle begins for the vineyard 24.

A. Operation—Spring Growing Season

During the growing season, the grapevines 16 will sprout green shoots, fruit 50 and foliage 52, shown in FIG. 3. The trellis structure of the present invention supports the fruiting canes 58 and fruit 50 in a vertical manner. The upper canopy 54 contains four or six fruiting canes, shoots, fruit 50 and foliage 52. The lower canopy 62 contains renewal canes 60, foliage 52 and green shoots that are encouraged to grow down becoming next years renewal canes 60.

During the period of upper canopy growth, shoots form over the entire length of the cane 58. Referring more particularly to FIG. 3, in accordance with the method 10 of the present invention, the grapevine 16 in the of the growing season produces a plurality of new shoots. In the lower canopy 62, new shoots 63 project from the distal end of trunk 56 (shown in FIG. 2). The new shoots continue to grow throughout the and into the summer when they become renewal canes 60. The young shoots 63 are permitted to grow and are trained in overlaying relation to the upper canopy support 36 trellis wires. In approximately mid-April, laborers remove 1 to 2 shoots per fruiting cane 58. This removal leaves cut-off young shoots, shown as 64, located approximately 18 inches to 24 inches below the top of the upper canopy 54. This creates a distinct window or zone of separation, shown as 66 on FIG. 4, between the upper 54 and lower 62 canopies. The removal of shoots between canopy levels is beneficial to the enhancement of separation and increased exposure to sun and air circulation.

At this time, the transfer of the movable support wires 40 from the lower cross-member 34 to the hairpin 48 position is done to further support the maturing canes 58 in the aforementioned window of separation. This process pulls the shoots 64 up and in, thereby enhancing the window of separation, which is necessary later in the harvest season.

B. Operation—Summer Growing Season

The Summer growing season requires little maintenance by the grower. The standard cultural practices (i.e., watering, fertilization, spraying and dusting of the vineyard 24) are done. The continued growth of the grapevines 16 furthers the segregation of the upper 54 and lower 62 canopies for the impending harvest.

The upper canopy 54 will require some maintenance during the summer months. This work will be minimal but will work to increase sugar levels and light to the fruit 50. A minor trimming of green shoots will take place that catches any outward growth that will conceal the fruit 50 from the air circulation and sun. Although the fruit 50 does not need full exposure it does need some exposure to be of the superior quality achieved by the vertical trellis system of the present method 10. The trimming will begin pre-bloom, early May, and continue monthly through the growing season. This trimming of the upper canopy 54 has a dual purpose. First, the trimming allows sunlight onto the lower canopy 62, reducing shading and thereby promoting a healthy maturation of next years replacement canes 60. Second, trimming will increase the effectiveness of the spraying and dusting that occur later in the season and with less frequency as the fruit 50 reaches maturity.

C. Operation—Harvest

The method 10 and trellis structure 12 of the present invention have particular utility in the vine drying of grapes 50 to form raisins. This process presently calls for the fruiting canes 58 bearing the bunches of grapes 50 to be severed (shown as 68 on FIG. 4) at a particular time prior to harvest so that dehydration occurs while the grapes 50 are still on the support trellis 12. Severing is easily accomplished by pruning the fruiting canes 58 in at the window of separation 66 at 68. The present invention method 10 and trellis apparatus 12 allows for harvest to be performed using fully automated harvesting techniques. Incorporation of the double tunnel harvesting apparatus 14, as set forth below, will allow for 2 to 3 acres per hour to be harvested with optimum efficiency.

D. Winter Pruning

When the fruiting canes 58 have produced their crop 50 and that crop 50 has been harvested, the fruiting canes 58 are removed. It is when the harvested fruiting canes 58 are removed that the movable support wires 40 may be returned to its lower position in the lower cross-member 34. The movable wires 40 remain in this position until the following season when they are once again raised to support the upper canopy 54.

The renewal canes 60 are selected and wrapped or tied to the main transverse wire 38. This positions the new fruiting canes 58 (formerly renewal canes 60) to produce a crop 50 during the subsequent growing season. Renewal spurs are pruned at the cordons where next years replacement canes 60 sprout. No changes to the trellis structure 12 of the present invention will be necessary due to the flexible nature of the random, flexible portions of the grapevine 16. The grapevine 16 will function around and on the method 10 and apparatus 12 herein described.

Figure 6:
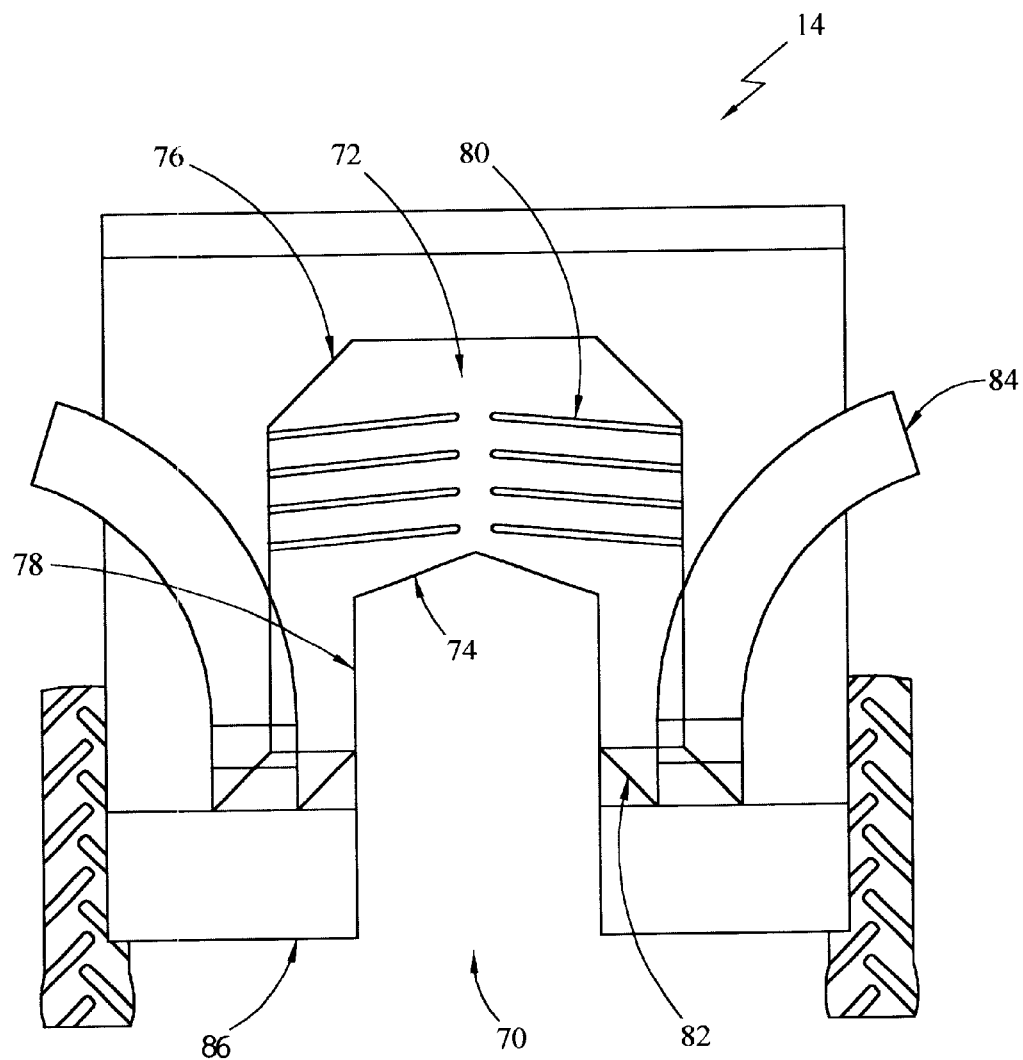
FIG. 6 is a fragmentary view of the double tunnel mechanical harvesting system apparatus of the present invention.
Figure 7:
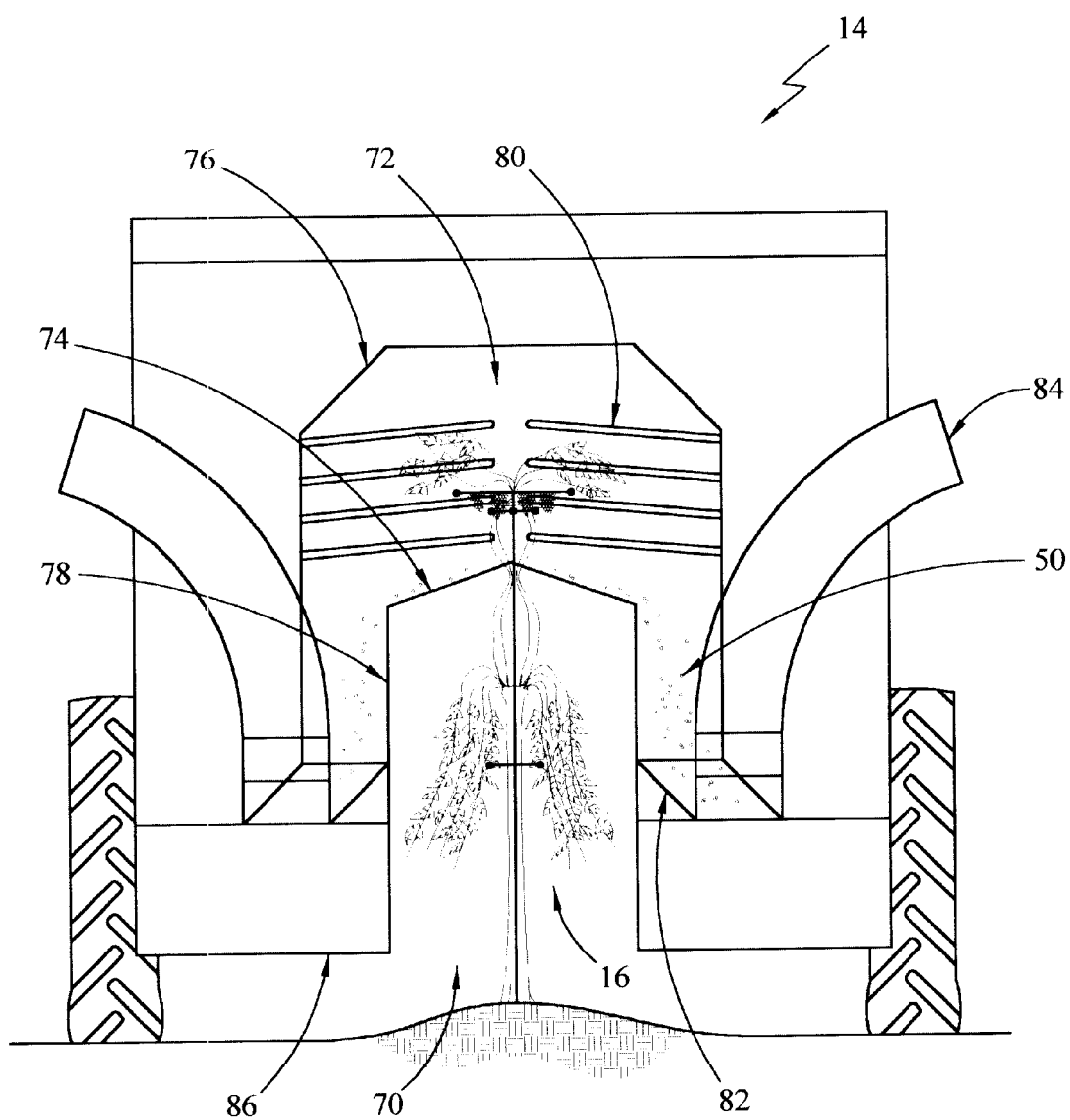
FIG. 7 is a fragmentary view of a grapevine being harvested by the double tunnel mechanical harvesting apparatus of the present invention.

The double tunnel mechanical harvesting apparatus 14, shown in FIGS. 6 and 7, will be advantageous with the increased planting of the method 10 described above. The double tunnel mechanical harvester 14 is separated, just as the grapevine 16 is separated, into a lower canopy tunnel 70 and upper canopy tunnel 72. The dividing mechanism 74 is at the bottom of the upper tunnel housing 76 and the top of the lower tunnel housing 78. The dividing mechanism 74 makes a complete seal at the window of separation 66 between the upper 54 and lower 62 canopies of the grapevine 16. As shown in FIG. 7, the lower tunnel housing 78 protects the lower canopy 62 from damage during harvest. The picking rods 80 within the upper canopy tunnel 72, provide the movement necessary to shake, or knock, the dried-on-the-vine raisins 50 from the severed fruiting canes 58, as shown in FIG. 7. The raisins 50 fall onto the lower canopy tunnel housing 78 and then onto the picking belt conveyor 82 at the bottom of the upper canopy tunnel housing 76. A vacuum fan (not shown) located in the leaf removal tunnel 84 pulls out any plant or other debris that falls on the picking belt conveyor 82 before the raisins 50 are deposited into the raisin bin 86. The picking belt conveyor 82 moves the raisins 50 from within the harvesting system to the raisin bin 86 placed at the bottom of the harvester 14. Once the raisin bin 86 is full, the bins 86 are deposited on the ground 18 intermittently and replaced on the harvester 14 by empty raisin bins 86 to be filled with more raisins.

From the description above, a number of advantages of the vertical trellis system harvested by the double tunnel mechanical harvesting system become evident. For instance, the upward movement of the vine 16 prior to its minimal outward movement requires less space by each plant, allowing for more grapevines 16 to be planted in the same size plot. The vertical movement and incorporation of the trellis structure 12 allows the fruit 50 more exposure to the sun for increased maturation on the vine 16. The vertical movement also allows for increased air circulation, which decreases infestation of parasites, fungi, and molds that develop and thrive in dark, damp, dense plants, such as grapevines 16. The increased air circulation and exposure of the fruit also allows for pesticides or other chemicals to be more effective because they are more likely to reach more of the plant. The segregation of the canopies 54 and 62 simplifies training laborers by simplifying the pruning, tying and training of the flexible portions, which minimizes manual labor and decreases costs to the grower. The double tunnel mechanical harvesting system that harvests the DOV raisins of the vertical trellising system 10 protects the lower canopy 62, while fully harvesting the product 50 from the upper canopy 54. Use of the double tunnel harvesting apparatus 14 at harvest reduces the need for laborers (in a season where traditionally laborers are in short supply).

Accordingly, the vertical trellis system of the present method and apparatus provides benefits by segregating the canopies of the botanical plant. It provides the advantages associated with the segregated canopies such as increased air circulation, increased efficiency in spraying of chemicals on the plants, production of a healthier crop of superior quality, a decrease in the amount of manual labor, and a decrease from threat of chemicals. Further advantages of the vertical trellis system become prevalent with the use of the double tunnel mechanical harvesting system which integrates the upper and lower canopy separation, protecting the replacement canes of the next season and efficiently harvesting the dried-on-the-vine raisins.

Therefore the method and apparatus for plant culture of the present invention provide an extremely efficient and dependable means by which crops can be grown and harvested while decreasing the amount of manual labor required. The use of manual labor will require little, if any, training of the field workers. The superior quality and quantity of the crop will be of such a fashion as to lend itself to full mechanized farming of such plants, and having particular utility in application to the commercial farming grapevines.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

Having described our invention, what we claim as new and desire to secure by Letter Patent is:

1. A method of raising vine plants, comprising the steps of:

A. growing a plurality of vine plants in the earth arranged in substantially parallel rows with a trunk of each of said vine plants extending generally upward from the surface of the earth on a trellis structure within their respective rows;

B. growing a plurality of canes from said trunk;
C. segregating said plurality of canes to form one or more fruiting canes and one or more renewal canes, said fruiting canes for growing a crop therefrom during a first growing season and said renewal canes for growing said crop therefrom during a second growing season but not during said first growing season;
D. extending each of said fruiting canes generally upward from said trunk along said trellis structure;
E. training each of said fruiting canes on one or more upper support members of said trellis structure to form an upper canopy;
F. training each of said renewal canes on one or more lower support members of said trellis structure to form a lower canopy;
G. forming a zone of separation vertically disposed between said upper canopy and said lower canopy; and
H. growing said crop in a generally pendant relation from said fruiting canes, said crop extending generally in the direction of the earth surface substantially in said zone of separation.

2. The method of raising vine plants of claim 1, wherein a plurality of shoots grow from said trunk and said fruiting canes during a particular growing season and said zone of separation forming step includes removing said shoots growing from said fruiting canes that are located between said upper canopy and said lower canopy.

3. The method of raising vine plants of claim 1, wherein said one or more upper support members comprises at least one support wire and said fruiting canes training step includes training said fruiting canes on said at least one support wire.

4. The method of raising vine plants of claim 1, wherein said one or more upper support members comprises a pair of substantially parallel support wires and said fruiting canes training step includes training said fruiting canes on said pair of substantially parallel support wires.

5. The method of raising vine plants of claim 4, wherein said pair of substantially parallel support wires are separated by an upper cross-member attached to said trellis structure, said upper cross-member having sufficient length to allow substantial air and sunlight into said vine plants.

6. The method of raising vine plants of claim 1, wherein said trellis structure further comprises a cane support means for supporting said fruiting canes in a generally vertical position above said trunk and said fruiting canes extending step further comprises engaging said cane support means to extend said fruiting canes upward from said trunk.

7. The method of raising vine plants of claim 6, wherein said cane support means comprises one or more moveable support wires and a clip member, said clip member attached to said trellis structure.

8. The method of raising vine plants of claim 1, further comprising the step of:
I. trimming a portion of the growth from said fruiting canes in said upper canopy to increase exposure of air and sunlight to said crop growing from said fruiting canes and to allow sunlight into said lower canopy.

9. The method of raising vine plants of claim 1, further comprising the steps of:
I. severing said fruiting canes to dry said crop on said vine plants; and
J. harvesting said crop from said vine plants.

10. The method of raising vine plants of claim 9, wherein said fruiting crops are severed in the zone of separation below said upper canopy.

11. The method of raising vine plants of claim 9, further comprising the step of:
removing said fruiting canes from said vine plants.

12. The method of raising vine plants of claim 1, further comprising the step of:
I. harvesting said crop from said vine plants;
J. removing said fruiting canes from said vine plants; and
K. moving each of said renewal canes from said lower canopy so as to extend said renewal canes generally upward from said trunk along said trellis structure to convert said renewal canes to a plurality of new fruiting canes.

13. A method of raising vine plants, comprising the steps of:
A. growing a plurality of vine plants in the earth arranged in substantially parallel rows with a trunk of each of said vine plants extending generally upward from the surface of the earth on a trellis structure within their respective rows;
B. growing a plurality of canes from said trunk;
C. segregating said plurality of canes to form one or more fruiting canes and one or more renewal canes, said fruiting canes for growing a crop therefrom during a first growing season and said renewal canes for growing said crop therefrom during a second growing season but not during said first growing season;
D. extending each of said fruiting canes generally upward from said trunk along said trellis structure;
E. training each of said fruiting canes on one or more upper support members of said trellis structure to form an upper canopy;
F. training each of said renewal canes on one or more lower support members of said trellis structure to form a lower canopy;
G. forming a zone of separation vertically disposed between said upper canopy and said lower canopy;
H. growing said crop in a generally pendant relation from said fruiting canes during said first growing season, said crop extending generally in the direction of the earth surface substantially in said zone of separation;
I. harvesting said crop from said vine plants;
J. removing said fruiting canes from said vine plants; and
K. moving each of said renewal canes from said lower canopy so as to extend said renewal canes generally upward from said trunk along said trellis structure to convert said renewal canes to a plurality of new fruiting canes for said second growing season.

14. The method of raising vine plants of claim 13, wherein said one or more upper support members comprises a pair of substantially parallel support wires and said fruiting canes training step includes training said fruiting canes on said pair of substantially parallel support wires.

15. The method of raising vine plants of claim 13, wherein said pair of substantially parallel support wires are separated by an upper cross-member attached to said trellis structure, said upper cross-member having sufficient length to allow substantial air and sunlight into said vine plants.

16. The method of raising vine plants of claim 12, wherein said trellis structure further comprises a cane support means for supporting said fruiting canes in a generally vertical position above said trunk and said fruiting canes extending step further comprises engaging said cane support means to extend said fruiting canes upward from said trunk.

17. The method of raising vine plants of claim 16, wherein said cane support means comprises one or more moveable support wires and a clip member, said clip member attached to said trellis structure.

18. The method of raising vine plants of claim 13, further comprising the step of trimming a portion of the growth from said fruiting canes in said upper canopy during said crop growing step to increase exposure of air and sunlight to said crop and to allow sunlight into said lower canopy.

19. The method of raising vine plants of claim 13, further comprising the steps of severing said fruiting canes to dry said crop on said vine plants prior to said harvesting step.

20. The method of raising vine plants of claim 19, wherein said fruiting crops are severed in the zone of separation below said upper canopy.

21. A method of raising vine plants, comprising the steps of:
   A. growing a plurality of canes from a trunk of a vine plant;
   B. segregating said plurality of canes to form fruiting canes and renewal canes, said fruiting canes for growing a crop therefrom during a first growing season and said renewal canes for growing said crop therefrom during a second growing season but not during said first growing season;
   C. training said fruiting canes on an upper support member of a trellis structure to form an upper canopy;
   D. training said renewal canes on a lower support member of said trellis structure to form a lower canopy;
   E. forming a zone of separation vertically disposed between said upper canopy and said lower canopy;
   F. growing said crop in a generally pendant relation from said fruiting canes during said first growing season, said crop extending substantially in said zone of separation;
   G. severing said fruiting canes to dry said crop on said vine plants;
   H. harvesting said crop from said vine plants; and
   I. moving said renewal canes from said lower canopy so as to convert said renewal canes to a plurality of new fruiting canes for said second growing season.

22. The method of raising vine plants of claim 21, wherein said upper support member comprises a pair of substantially parallel support wires and said fruiting canes training step includes training said fruiting canes on said pair of substantially parallel support wires.

23. The method of raising vine plants of claim 22, wherein said pair of substantially parallel support wires are separated by an upper cross-member attached to said trellis structure, said upper cross-member having sufficient length to allow substantial air and sunlight into said vine plants.

24. The method of raising vine plants of claim 21, wherein said trellis structure further comprises a cane support means for supporting said fruiting canes in a generally vertical position above said trunk and said fruiting canes training step further comprises engaging said cane support means to train said fruiting canes upward from said trunk.

25. The method of raising vine plants of claim 24, wherein said cane support means comprises one or more moveable support wires and a clip member, said clip member attached to said trellis structure.

26. The method of raising vine plants of claim 21, further comprising the step of trimming a portion of the growth from said fruiting canes in said upper canopy during said crop growing step to increase exposure of air and sunlight to said crop and to allow sunlight into said lower canopy.

* * * * *